(12) United States Patent
Murase

(10) Patent No.: US 10,069,997 B2
(45) Date of Patent: Sep. 4, 2018

(54) IMAGE READING UNIT AND IMAGE READING DEVICE AND IMAGE FORMING APPARATUS INCLUDING THE SAME

(71) Applicant: KYOCERA Document Solutions Inc., Osaka (JP)

(72) Inventor: Takaaki Murase, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/637,982

(22) Filed: Jun. 29, 2017

(65) Prior Publication Data

US 2018/0035001 A1    Feb. 1, 2018

(30) Foreign Application Priority Data

Jul. 26, 2016    (JP) ................................. 2016-146585

(51) Int. Cl.
| | |
|---|---|
| H04N 1/04 | (2006.01) |
| H04N 1/193 | (2006.01) |
| H04N 1/028 | (2006.01) |
| H04N 1/19 | (2006.01) |

(52) U.S. Cl.
CPC ....... *H04N 1/1937* (2013.01); *H04N 1/02835* (2013.01); *H04N 1/1903* (2013.01); *H04N 1/1936* (2013.01)

(58) Field of Classification Search
CPC ............ H04N 1/02835; H04N 1/1903; H04N 1/1936; H04N 1/1937; H04N 2201/0081; H04N 1/00694; H04N 1/02815; H04N 2201/03112; H04N 5/2256; H04N 1/401

USPC .............. 358/498, 1.12, 461, 474, 475, 482; 382/124, 125

See application file for complete search history.

(56) References Cited

U.S. PATENT DOCUMENTS

| | | | |
|---|---|---|---|
| 6,133,565 A * | 10/2000 | Fujimoto | ............. H04N 1/0285 250/234 |
| 7,884,976 B2 * | 2/2011 | Minobe | .............. H04N 1/02815 250/208.1 |
| 8,345,325 B2 * | 1/2013 | Schmidt | ................... H04N 1/03 358/474 |
| 2003/0095335 A1 | 5/2003 | Ogi | ............................... 359/652 |

(Continued)

FOREIGN PATENT DOCUMENTS

JP    2003-121608 A    4/2003

*Primary Examiner* — Negussie Worku
(74) *Attorney, Agent, or Firm* — Stein IP, LLC

(57) ABSTRACT

A reading module includes a light source, an optical system for forming an image of reflection light from a document illuminated by the light source, and a sensor including a plurality of sensor chips to convert the image light formed by the optical system into an electric signal. The optical system includes a mirror array including a plurality of reflecting mirrors connected in the main scanning direction, first aperture stops each of which adjusts light amount of the image light reflected from each of the reflecting mirrors, second aperture stops each extending from the opening edge of the first aperture stop toward the mirror array, first light shielding walls each of which extends from a boundary between the sensor chips toward the first aperture stops, and second light shielding walls extending from both sides in the main scanning direction of the first aperture stop toward the sensor chips.

7 Claims, 5 Drawing Sheets

(56) References Cited

U.S. PATENT DOCUMENTS

| | | | |
|---|---|---|---|
| 2008/0317301 A1* | 12/2008 | Fenrich | G06K 9/00026 382/124 |
| 2009/0147321 A1* | 6/2009 | Minobe | H04N 1/02815 358/475 |
| 2010/0225983 A1* | 9/2010 | Fujii | H04N 1/00909 358/498 |
| 2012/0314267 A1* | 12/2012 | Suzuki | G03G 15/607 358/498 |
| 2014/0177012 A1* | 6/2014 | Kubo | H04N 1/123 358/474 |
| 2016/0142586 A1* | 5/2016 | Ishida | H04N 1/58 358/1.12 |
| 2018/0035002 A1* | 2/2018 | Murase | H04N 1/02835 |
| 2018/0149861 A1* | 5/2018 | Ouchi | G02B 27/0025 |
| 2018/0152581 A1* | 5/2018 | Murase | H04N 1/0306 |
| 2018/0152582 A1* | 5/2018 | Murase | H04N 1/02885 |

* cited by examiner

IMAGE READING UNIT AND IMAGE READING DEVICE AND IMAGE FORMING APPARATUS INCLUDING THE SAME

INCORPORATION BY REFERENCE

This application is based upon and claims the benefit of priority from the corresponding Japanese Patent Application No. 2016-146585 filed Jul. 26, 2016, the entire contents of which are hereby incorporated by reference.

BACKGROUND

The present disclosure relates to a reading module used in a digital copier, an image scanner, or the like, for reading image light reflected from a document illuminated by light, and to an image reading device and an image forming apparatus including the reading module.

Conventionally, there are two types of reading systems for the image reading device mounted in a multifunction peripheral or the like using an electrophotographic process; one is a CCD system using a charge coupled element called a charge coupled device (CCD) sensor, and the other is a CIS system using a photoelectric conversion element called a complementary MOS (CMOS) sensor.

The CCD system is a system in which a reduced image is formed on an image sensor having a size of $\frac{1}{5}$ to $\frac{1}{9}$ of a document size by using a plurality of flat mirrors and optical lenses so as to read the image. The CCD system has a merit of a large depth of field. Here, the depth of field is a range in which a subject (i.e., the document) looks focused even if it is shifted in an optical axis direction from a just focus position. In other words, a large depth of field means that even if the document is shifted a little from a prescribed position, a not so blurred image can be read.

On the other hand, the CCD system has a demerit of a very long optical path length (a distance of light propagation from a subject to a sensor), which is 200 to 500 mm. In order to secure this optical path length in a limited space of a carriage, the image reading device uses a plurality of flat mirrors to change the propagation direction of the light. As a result, the number of components is increased, and cost is increased. In addition, when using a lens in the optical system, a difference of refractive index due to wavelength causes color aberration. In order to correct this color aberration, a plurality of lenses is necessary. Thus, use of a plurality of lenses also causes an increase of cost.

In the CIS system, a plurality of erect equal magnification rod lenses are arranged in an array, and the image is formed on an image sensor having the same size as a document. The CIS system has a merit of a relatively short optical path length of 10 mm to 20 mm and a compact size compared with the CCD system. In addition, because only the rod lenses are used for forming an image, mirrors are not necessary though they are necessary in the CCD system, and hence a scanner unit including a CIS sensor can be slimmer. In addition, because it has a simple structure, low cost can be achieved. On the other hand, because the CIS system has a very small depth of field, when a document is shifted in the optical axis direction from a prescribed position, influence of blur due to image bleeding becomes large by each lens magnification shift. As a result, the CIS system has a demerit that a book document or a document having an uneven surface cannot be uniformly read.

In recent years, there are proposed image reading systems using a reflecting mirror array in the imaging optical system in a different manner from the CCD system or the CIS system described above. In this system, reflecting mirrors are arranged in an array, and a reduced inverted image of a document is formed on a sensor for each corresponding reading area. However, unlike the CIS system using a rod lens array, one area is read to form an image by one optical system. In addition, a telecentric system is adopted as an image forming system, and there is no occurrence of image bleeding due to overlapping of images having different magnifications so that image blur is suppressed, when reading the document separately for each of the areas. Thus, a compound eye reading system is realized.

Further, in this system, only mirrors are used in the optical system, and hence color aberration does not occur unlike a case where a lens is used in the optical system. Therefore, it is not necessary to perform a correction concerning color aberration, and hence the number of elements constituting the optical system can be reduced.

SUMMARY

A reading module according to a first aspect of the present disclosure includes a light source, an optical system, and a sensor. The light source illuminates a document. The optical system forms an image of reflection light from the document illuminated by the light source, as image light. The sensor includes a plurality of sensor chips adjacently arranged in a main scanning direction for converting the image light formed by the optical system into an electric signal. The optical system includes a mirror array, first aperture stops, second aperture stops, first light shielding walls, and second light shielding walls. The mirror array includes a plurality of reflecting mirrors connected in an array in the main scanning direction, each of which has an aspheric reflecting surface. Each of the first aperture stops is disposed between each of the reflecting mirrors and each of the sensor chips, so as to adjust light amount of the image light reflected from each of the reflecting mirrors. Each of the second aperture stops extends in a tapered shape from an opening edge of the first aperture stop toward the mirror array. Each of the first light shielding walls is formed to extend from a boundary between the sensor chips toward the first aperture stops, so as to shield stray light entering each of the sensor chips. The second light shielding walls are formed to extend from both sides in the main scanning direction of each of the first aperture stops toward the sensor chips, so as to shield the stray light entering each of the sensor chips.

Other objects of the present disclosure and specific advantages obtained by the present disclosure will become more apparent from the description of embodiments given below.

DETAILED DESCRIPTION

Figure 1:
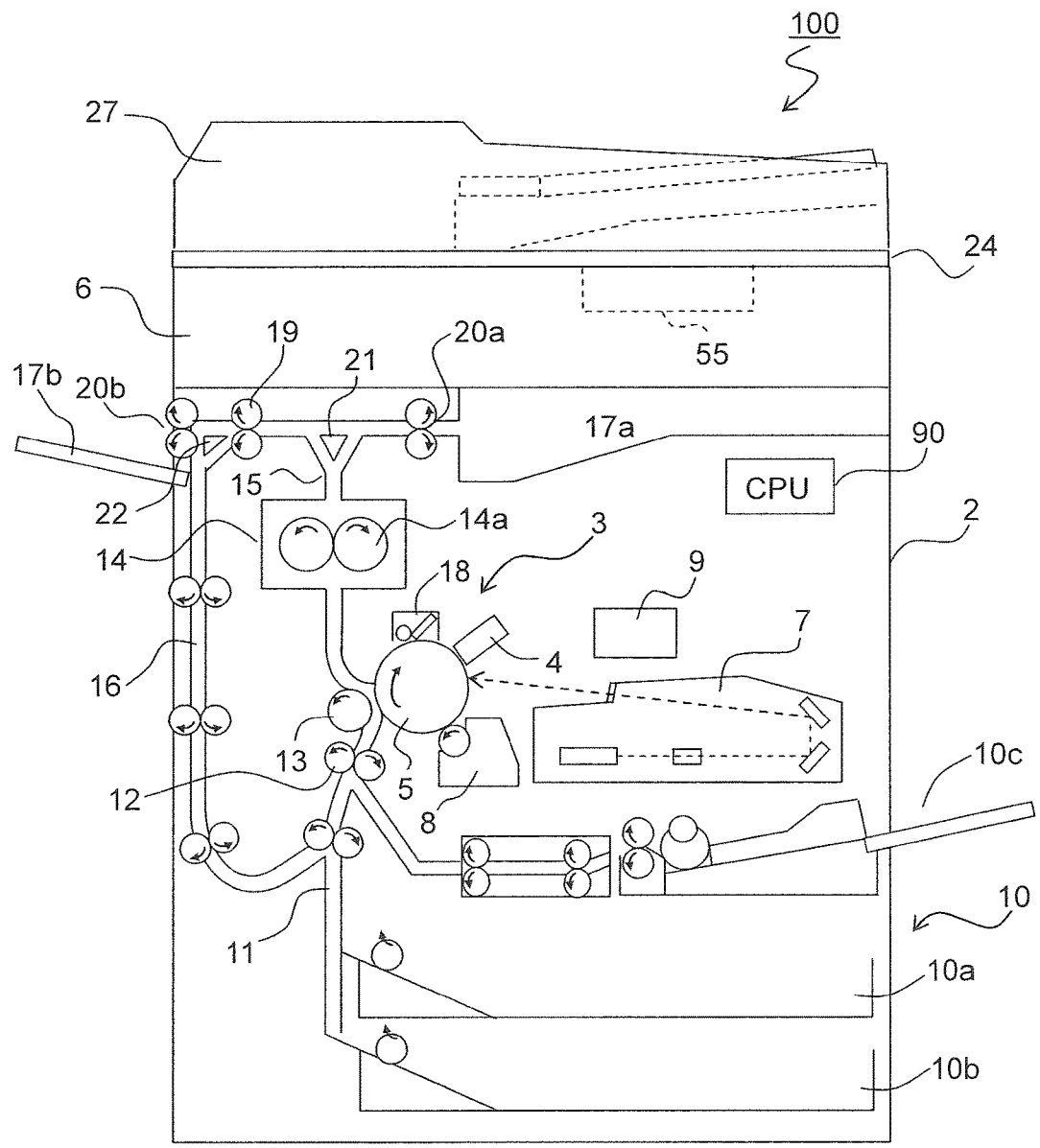
FIG. 1 is a cross-sectional side view illustrating the entire structure of an image forming apparatus including an image reader unit using a reading module of the present disclosure.

Hereinafter, an embodiment of the present disclosure is described with reference to the drawings. FIG. 1 is a schematic structural diagram of an image forming apparatus 100 including an image reader unit 6 using a reading module 50 of the present disclosure. In FIG. 1, when the image forming apparatus 100 (e.g., a digital multifunction peripheral) performs a copy operation, the image reader unit 6 described later reads image data of a document and converts it into an image signal. On the other hand, in an image forming unit 3 in a multifunction peripheral main body 2, a photosensitive drum 5, which rotates in a clockwise direction in FIG. 1, is uniformly charged by an electrification unit 4. Further, a laser beam from an exposing unit (such as a laser scanning unit) 7 forms an electrostatic latent image on the photosensitive drum 5 based on the document image data read by the image reader unit 6. A developing unit 8 makes developer (hereinafter referred to as toner) adhere to the formed electrostatic latent image so that a toner image is formed. This developing unit 8 is supplied with toner from a toner container 9.

Toward the photosensitive drum 5 on which the toner image is formed as described above, a paper sheet is conveyed from a paper feed mechanism 10 via a paper sheet conveying path 11 and a registration roller pair 12 to the image forming unit 3. The paper feed mechanism 10 includes paper feed cassettes 10a and 10b, and a stack bypass (manual feed tray) 10c disposed above them. The conveyed paper sheet passes through a nip between the photosensitive drum 5 and a transfer roller 13 (image transfer unit), and hence the toner image on the surface of the photosensitive drum 5 is transferred to the paper sheet. Further, the paper sheet with the transferred toner image is separated from the photosensitive drum 5 and is conveyed to a fixing unit 14 including a fixing roller pair 14a so that the toner image is fixed. The paper sheet after passing through the fixing unit 14 is conveyed to one of two directions by a route switching mechanism 21, 22 disposed at a branch point of the paper sheet conveying path 15, i.e. is conveyed to a paper discharge part constituted of a first discharge tray 17a and a second discharge tray 17b, directly or after being sent to a reverse conveying path 16 and after double-sided copying.

The toner remaining on the surface of the photosensitive drum 5 after transfer of the toner image is removed by a cleaning device 18. In addition, a remaining charge on the surface of the photosensitive drum 5 is eliminated by a charge elimination device (not shown) disposed on a downstream side of the cleaning device 18 in the rotation direction of the photosensitive drum 5.

The image reader unit 6 is disposed on an upper part of the multifunction peripheral main body 2, a platen (document presser) 24 is disposed in an openable and closable manner, for pressing and retaining the document placed on a contact glass 25 (see FIG. 2) of the image reader unit 6, and an auto document feeder 27 is attached onto the platen 24.

Further, in the multifunction peripheral main body 2, there is disposed a control unit (CPU) 90 for controlling operations of the image forming unit 3, the image reader unit 6, the auto document feeder 27, and the like.

Figure 2:
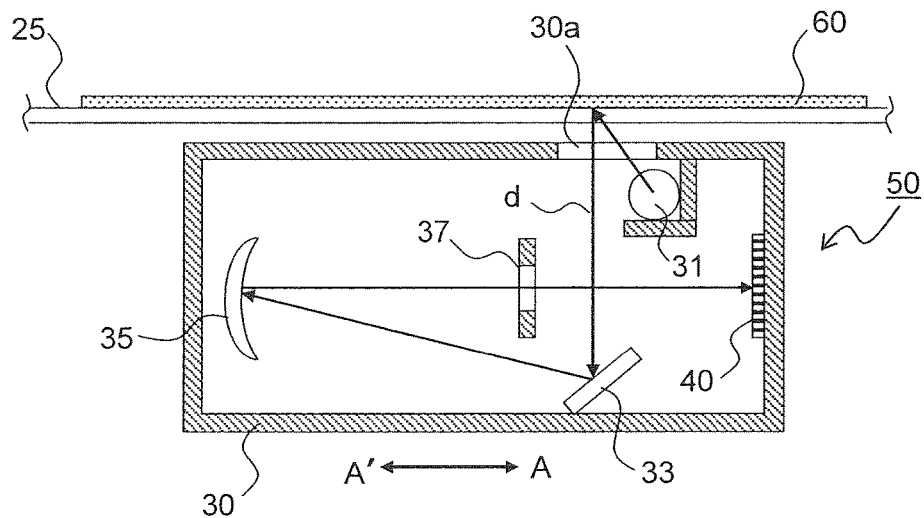
FIG. 2 is a cross-sectional side view illustrating an internal structure of the reading module according to an embodiment of the present disclosure mounted in the image reader unit.
Figure 3:
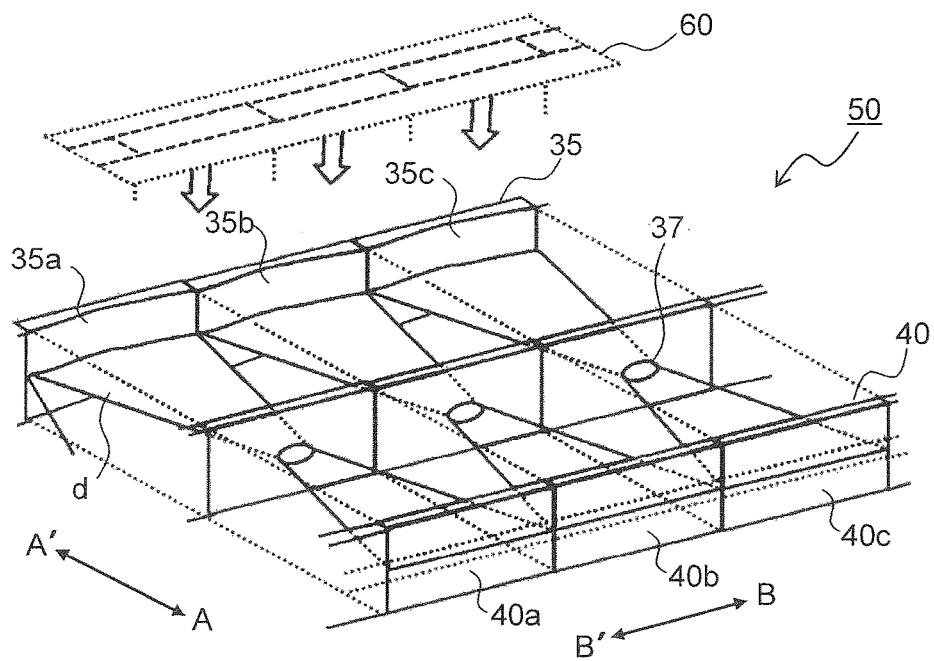
FIG. 3 is a partial perspective view illustrating an internal structure of the reading module of this embodiment.
Figure 4:
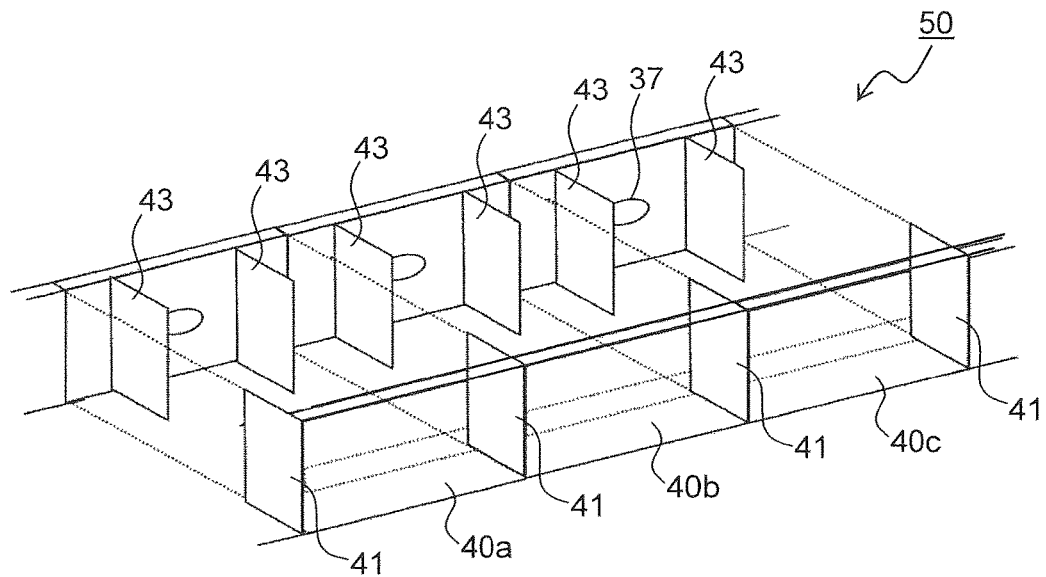
FIG. 4 is a partial perspective view illustrating a structure from a first aperture stop to a sensor in the reading module of this embodiment.

FIGS. 2 and 3 are respectively a cross-sectional side view and a partial perspective view illustrating an internal structure of the reading module 50 mounted in the image reader unit 6 according to an embodiment of the present disclosure. FIG. 4 is a partial perspective view illustrating a structure from a first aperture stop 37 to a sensor 40 in the reading module 50 of this embodiment. Note that first light shielding walls 41 and second light shielding walls 43 illustrated in FIG. 4 are not illustrated in FIGS. 2 and 3. In addition, a second aperture stop 39 (see FIG. 6) is not illustrated in FIGS. 2 to 4. The reading module 50 moves in a sub-scanning direction (arrow AA' direction) while reading an image of a surface side (lower side in FIG. 2) of a document 60 disposed on the contact glass 25. In addition, the reading module 50 reads an image of the surface side of the document 60 fed by the auto document feeder 27 (see FIG. 1), in a stopped state just below an automatic reading position of the contact glass 25.

As illustrated in FIG. 2, in a casing 30 of the reading module 50, there are disposed a light source 31, a flat mirror 33, a mirror array 35 constituted of a plurality of reflecting mirrors having a aspheric reflecting surface, the first aperture stops 37, and the sensor 40 as reading means. Note that the sensor 40 is supported by a sensor substrate (not shown). In addition, a home position of the reading module 50 is just below a shading plate (not shown) for obtaining white color reference date.

In the structure described above, when the document image is read by a document fixing method, the document 60 is first placed on the contact glass 25 with its image surface facing downward. Then, the light from the light source 31 illuminates the image surface of the document 60 while the reading module 50 is moved at a predetermined speed from a scanner home side to a scanner return side. As a result, the light reflected from the image surface of the document 60 becomes image light d (shown by a solid line arrow in FIG. 2), is condensed by the mirror array 35 after its optical path is changed by the flat mirror 33, passes through the first aperture stop 37 and forms an image on the sensor 40. The image light d forming the image is divided into pixels in the sensor 40 and is converted into an electric signal corresponding to densities of individual pixels, and thus the image is read.

On the other hand, when the document image is read by a sheet through method, the reading module 50 is moved just below an image reading area (image reading position) of the contact glass 25. Then, document sheets are sequentially fed to the image reading area while being slightly pressed by the auto document feeder 27, and the image surface of the document sheet is illuminated by the light from the light source 31 while the image light d reflected from the image surface forms an image on the sensor 40 via the flat mirror 33, the mirror array 35, and the first aperture stop 37, so that the image is read.

As illustrated in FIG. 3, the sensor 40 includes a plurality of sensor chips 40a, 40b, 40c . . . arranged adjacently in a main scanning direction (arrow BB' direction). In addition, the mirror array 35 for forming images of the image light d on the sensor 40 also has a structure in which a plurality of reflecting mirrors 35a, 35b, 35c . . . corresponding to the sensor chips 40a, 40b, 40c . . . are connected in an array.

This embodiment uses the sensor 40 including the plurality of sensor chips 40a, 40b, 40c . . . arranged adjacently in the main scanning direction. Therefore, for example, when the image light d after being reflected by the reflecting mirror 35b and after passing through the second aperture stop 39 (see FIG. 6) and the first aperture stop 37 forms an image on the corresponding sensor chip 40b, the image light d outside the reading area may become stray light entering the sensor chip 40a or 40c neighboring to the sensor chip 40b in the main scanning direction.

Therefore, in this embodiment, as illustrated in FIG. 4, there are disposed first light shielding walls 41 protruding from boundaries of the sensor chips 40a, 40b, 40c . . . in the direction toward the first aperture stops 37, and the second light shielding walls 43 protruding from both sides in the main scanning direction of the first aperture stop 37 in the direction toward the sensor chips 40a, 40b, 40c . . . .

Figure 5:
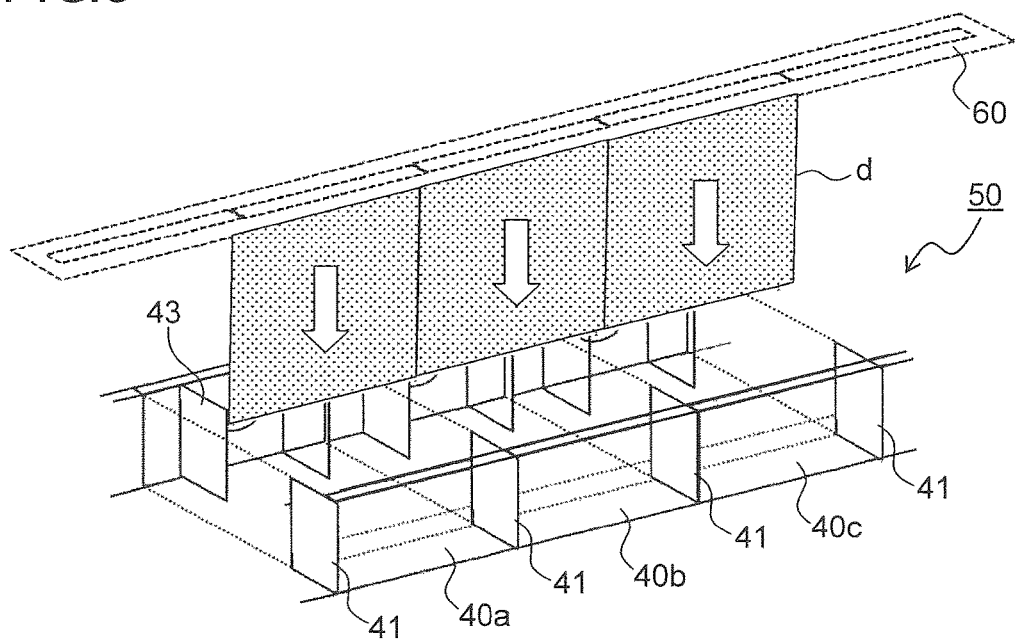
FIG. 5 is a diagram illustrating a manner in which image light reflected from a document passes through between a first light shielding wall and a second light shielding wall in FIG. 4.

With the structure of this embodiment, as illustrated in FIG. 5, the image light d reflected from each of areas of the document 60 divided in the main scanning direction passes through between the first light shielding wall 41 and the second light shielding wall 43, and then its optical path is changed by the flat mirror 33 (see FIG. 2), and the image light d enters each of the reflecting mirrors 35a, 35b, 35c . . . of the mirror array 35. The image light d is reduced by each of the reflecting mirrors 35a, 35b, 35c . . . by a predetermined reduction scale, passes through the second aperture stop 39 (see FIG. 6) and the first aperture stop 37 sequentially, and forms an image on the corresponding one of the sensor chips 40a, 40b, 40c . . . .

In this case, as to the image light d that forms an image on the sensor chip 40b, for example, a part outside the reading area is shielded by the first light shielding wall 41 and the second light shielding wall 43, and hence is protected from being stray light entering the sensor chip 40a or 40c adjacent to the sensor chip 40b in the main scanning direction.

In addition, the image light d reflected from the document 60 passes through between the first light shielding wall 41 and the second light shielding wall 43, and hence the optical path of the image light d can be secured in a limited space of the reading module 50 so that the compact reading module 50 can be realized.

Figure 6:
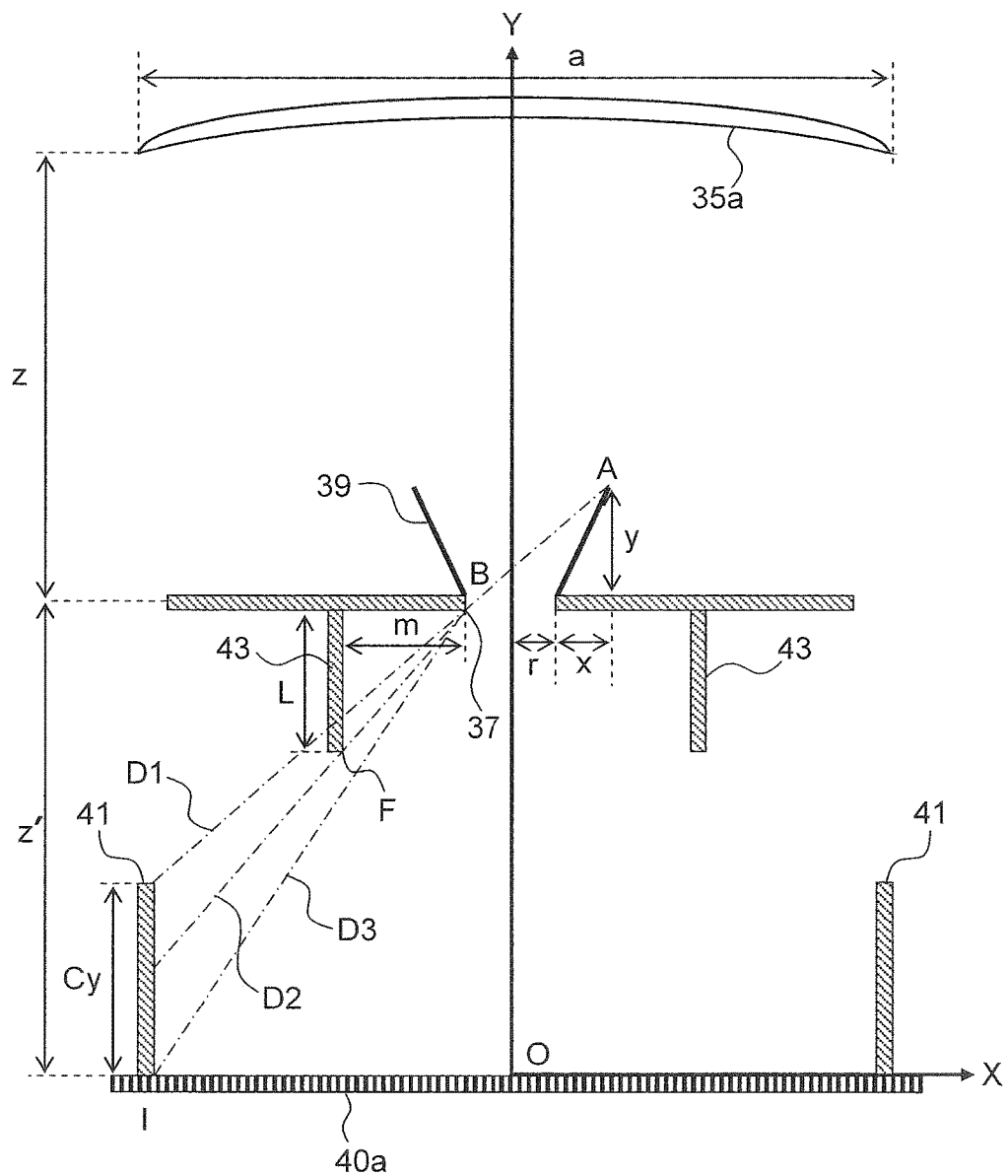
FIG. 6 is a cross-sectional plan view illustrating a structure between one reflecting mirror and a corresponding sensor chip in the reading module.

Next, a method of determining protrusion lengths (sizes in the sub-scanning direction) of the first light shielding wall 41 and the second light shielding wall 43 is described. FIG. 6 is a cross-sectional plan view of a structure between one reflecting mirror 35a and the corresponding sensor chip 40a in the reading module 50. Note that other structures between one of the reflecting mirrors 35b, 35c . . . and the corresponding one of the sensor chips 40b, 40c . . . is the same as that illustrated in FIG. 6.

Here, a coordinate origin O is put at the center of the sensor chip 40a in the main scanning direction, an X axis is put on a straight line parallel to the sensor chip 40a (in the main scanning direction) from the coordinate origin O, and a Y axis is put on a vertical line from the coordinate origin O to the reflecting mirror 35a (in the sub-scanning direction). In addition, a mirror width of the reflecting mirror 35a in the main scanning direction is represented by "a", and an aperture radius of the first aperture stop 37 is represented by r. In addition, the second aperture stop 39 is disposed to extend in a tapered shape from the opening edge of the first aperture stop 37 toward the reflecting mirror 35a, a length of projection of the second aperture stop 39 to the X axis (X direction distance) is represented by x, the protrusion length (Y direction distance) is represented by y, distances from the first aperture stop 37 to the reflecting mirror 35a and the sensor chip 40a are respectively represented by z and z'.

Further, a distance from the opening edge of the first aperture stop 37 to the second light shielding wall 43 is represented by m.

First, a case where only the first light shielding walls 41 are disposed without disposing the second light shielding walls 43 is considered. In this case, the first light shielding wall 41 is required to shield a light beam D1 that passes a point A at a distal end of the second aperture stop 39 and a point B on the opening edge of the first aperture stop 37 at a position opposite to the point A with respect to the Y axis.

With reference to FIG. 6, coordinates of the point A is (r+x, z'+y), and coordinates of the point B is (−r, z'). Therefore, the light beam D1 passing through the points A and B is expressed by the following equation.

$$Y = y/(2r+x) \cdot X + \{ry/(2r+x)\} + z' \quad (1)$$

Coordinates of a point I on the sensor chip 40a on which the first light shielding wall 41 is formed is (−a/2, 0), and a protrusion length of the first light shielding wall 41 is supposed to be Cy, then a protrusion length Cy1 in the case where only the first light shielding wall 41 is disposed is a value of Y obtained by substituting X=−a/2 into the equation (1) as below.

$$Cy1 = (r - a/2) \cdot \{y/(2r+x)\} + z' \quad (2)$$

Next, a case where the second light shielding wall 43 is disposed is considered. A protrusion length of the second light shielding wall 43 is supposed to be L, and then coordinates of a point F at a distal end of the second light shielding wall 43 is (−m−r, z'−L). Therefore, a light beam D2 that passes the point B on the opening edge of the first aperture stop 37 and the point F is expressed by the following equation.

$$Y = (L/m) \cdot X + (L/m) \cdot r + z' \quad (3)$$

In this case, a protrusion length Cy2 of the first light shielding wall 41 is a value of Y obtained by substituting X=−a/2 into the equation (3) as below.

$$Cy2 = (r - a/2) \cdot (L/m) + z' \quad (4)$$

In other words, it is understood that if the protrusion length of the second light shielding wall 43 is L and the protrusion length Cy2 of the first light shielding wall 41 is (r−a/2)·(L/m)+z', then the first light shielding wall 41 and the second light shielding wall 43 can securely shield the stray light.

Next, a range of the protrusion length L of the second light shielding wall 43 is considered. In order to shield the stray light with the second light shielding wall 43, the optical path of the light beam D1 passing the points A and B should be shielded. In other words, when the point F at the distal end of the second light shielding wall 43 is on the light beam D1, the protrusion length L becomes a minimum value Lmin. Therefore, X=−m−r and Y=z'−Lmin are substituted into the equation (1) as below.

$$z' - Lmin = -\{y/(2r+x)\} \cdot (m+r) + \{ry/(2r+x)\} + z'$$

$$Lmin = \{y/(2r+x)\} \cdot (m+r) - \{ry/(2r+x)\}$$

$$Lmin = my/(2r+x) \quad (5)$$

In addition, if the second light shielding wall 43 shields a light beam D3 that passes the point B and a proximal end of the first light shielding wall 41 (point I), there is a part of the reading area on the sensor chip 40a that does not receive the image light. In other words, when the point F at the distal end of the second light shielding wall 43 is on the light beam D3, the protrusion length L becomes a maximum value Lmax. Here, the light beam D3 that passes the points B and I is expressed as below.

$$Y = z'/(a/2-r) \cdot X + f/(a/2-r) \cdot a/2 \quad (6)$$

Then, $X = -m-r$ and $Y = z' - Lmax$ are substituted into the equation (6) as below.

$$z' - Lmax = -z'/(a/2-r) \cdot (m+r) + z'/(a/2-r) \cdot a/2$$

$$Lmax = z' + z'/(a/2-r) \cdot (m+r-a/2) \quad (7)$$

Therefore, as understood from the equations (5) and (7), in order to shield stray light, the protrusion length L of the second light shielding wall 43 is required to be in the range as below.

$$my/(2r+x) < L < z' + z'/(a/2-r) \cdot (m+r-a/2) \quad (8)$$

Next, a relationship between the protrusion length Cy of the first light shielding wall 41 and the protrusion length L of the second light shielding wall 43 is considered. If the protrusion lengths of the first light shielding wall 41 and the second light shielding wall 43 become long, the first light shielding wall 41 and the second light shielding wall 43 are easily deformed by heat from the light source 31 so that they may shield the optical path of the image light d. In addition, cost for forming the first light shielding wall 41 and the second light shielding wall 43 is increased. Therefore, it is preferred to minimize a total length of the protrusion length Cy of the first light shielding wall 41 and the protrusion length L of the second light shielding wall 43 as much as possible.

Figure 7:
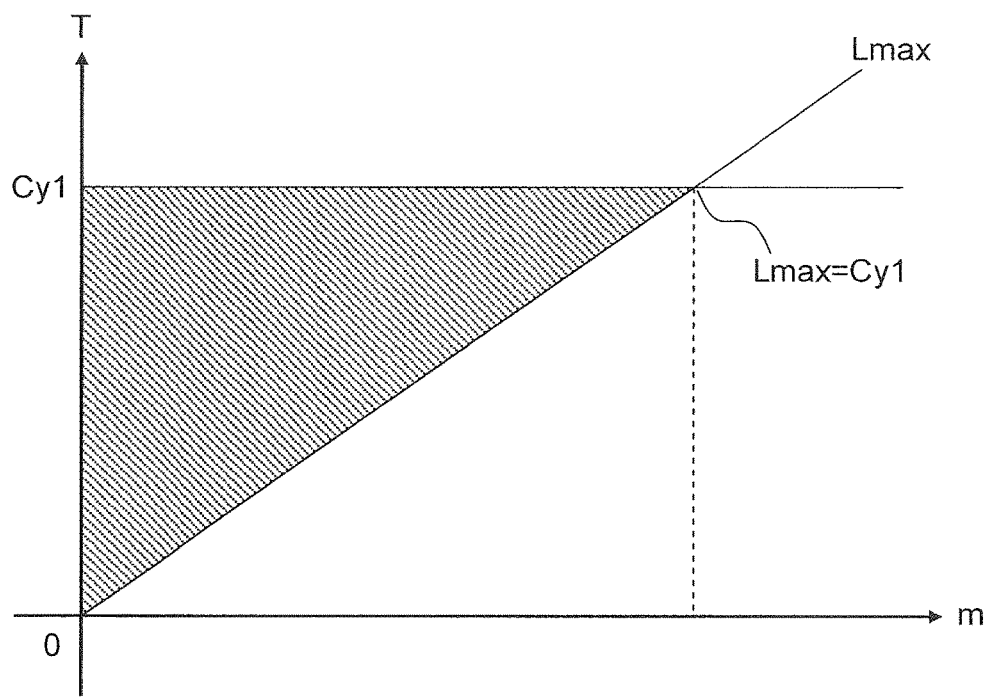
FIG. 7 is a graph showing a relationship between a distance from an opening edge of the first aperture stop to a second light shielding wall and a total protrusion length of the first light shielding wall and the second light shielding wall.

FIG. 7 is a graph showing a relationship between a distance m from the opening edge of the first aperture stop 37 to the second light shielding wall 43 and a total protrusion length T of the first light shielding wall 41 and the second light shielding wall 43. As illustrated in FIG. 7, when m is 0, the second light shielding wall 43 does not exist, and hence the total protrusion length T is the protrusion length Cy1 of the first light shielding wall 41 without disposing the second light shielding wall 43. On the other hand, the maximum value Lmax of the protrusion length L of the second light shielding wall 43 is increased in accordance with the distance m from the opening edge of the first aperture stop 37 to the second light shielding wall 43. Therefore, the protrusion length Cy of the first light shielding wall 41 necessary for shielding the stray light becomes smaller as the distance m becomes larger as illustrated with hatching in FIG. 7.

Further, when the protrusion length Lmax of the second light shielding wall 43 becomes equal to the protrusion length Cy1 of the first light shielding wall 41, Cy becomes 0 so that only the second light shielding wall 43 can shield the stray light. When Lmax equals to Cy1, the following equation is derived from the equations (2) and (7).

$$(r-a/2) \cdot \{y/(2r+x)\} + z' = z' + z'/(a/2-r) \cdot (m+r-a/2)$$

$$m = -(r-a/2)^2/(2r+x) \cdot (y/z') - r + a/2 \quad (9)$$

On the other hand, when the protrusion length Lmax of the second light shielding wall 43 becomes larger than the protrusion length Cy1 of the first light shielding wall 41, the total protrusion length T also becomes larger than the protrusion length Cy1. Therefore, as derived from the equation (9), when the distance m from the opening edge of the first aperture stop 37 to the second light shielding wall 43 is in the following range:

$$0 < m < -(r-a/2)^2/(2r+x) \cdot (y/z) - r + a/2 \quad (10),$$

the total protrusion length T of the first light shielding wall 41 and the second light shielding wall 43 can be smaller than the protrusion length Cy1 in the case where only the first light shielding wall 41 is disposed.

The present disclosure is not limited to the embodiment described above, but can be variously modified within the scope of the present disclosure without deviating from the spirit thereof. For example, the embodiment described above exemplifies the image reader unit 6 mounted in the image forming apparatus 100, as the image reading device, but the present disclosure can be equally applied to an image scanner that is used as a separate unit from the image forming apparatus 100.

The present disclosure can be used in an image reading device including a reading module using a reading system with reflecting mirrors arranged in an array. Using the present disclosure, it is possible to provide an image reading device and an image forming apparatus including the same, in which sensor chips corresponding to a reduction scale of reflecting mirrors are adjacently arranged on a base substrate, and stray light can be prevented from entering the sensors with a simple structure.

What is claimed is:

1. An image reading unit comprising:
   a light source for illuminating a document;
   an optical system for forming an image of reflection light from the document illuminated by the light source, as image light; and
   a sensor including a plurality of sensor chips adjacently arranged in a main scanning direction for converting the image light formed by the optical system into an electric signal, wherein
   the optical system include
      a mirror array including a plurality of reflecting mirrors connected in an array in the main scanning direction, each of the reflecting mirrors having an aspheric reflecting surface,
      first aperture stops each being disposed between each of the reflecting mirrors and each of the sensor chips, so as to adjust light amount of the image light reflected from each of the reflecting mirrors,
      second aperture stops each extending in a tapered shape from an opening edge of each of the first aperture stops toward the mirror array,
      first light shielding walls each being formed to extend from a boundary between the sensor chips toward the first aperture stops, so as to shield stray light entering each of the sensor chips, and
      second light shielding walls being formed to extend from both sides in the main scanning direction of each of the first aperture stops toward the sensor chips, so as to shield the stray light entering each of the sensor chips.

2. The image reading unit according to claim 1, wherein a protrusion length L of the second light shielding wall satisfies the following expression:

$$my/(2r+x) < L < z' + z'/(a/2-r) \cdot (m+r-a/2),$$

where "a" represents a mirror width of the reflecting mirror in a main scanning direction, r represents an aperture radius of the first aperture stop, x represents a length of projection of the second aperture stop to an X axis as a straight line parallel to the main scanning direction and passing a coordinate origin at a center of the sensor chip in the main scanning direction, while Y axis is a straight line perpendicular to the main scanning direction and passing the coordinate origin, y represents a protrusion length of the second aperture stop in a Y axis direction, m represents a distance in an X axis direction from the opening edge of the first aperture stop to the second light shielding wall, and z' represents a distance in the Y axis direction from the first aperture stop to the sensor chip.

3. The image reading unit according to claim 2, wherein the distance m from the opening edge of the first aperture stop to the second light shielding wall satisfies the following expression:

$$0<m<-(r-a/2)2/(2r+x)\cdot(y/z')-r+a/2.$$

4. The image reading unit according to claim 3, wherein a maximum value Lmax of a protrusion length L of the second light shielding wall is equal to or less than a protrusion length of the first light shielding wall necessary for shielding the stray light in a case without the second light shielding wall.

5. The image reading unit according to claim 1, wherein light emitted from the light source is reflected from the document and enters the mirror array as the image light after passing through between the first light shielding wall and the second light shielding wall.

6. An image reading device comprising:
the image reading unit according to claim 1;
a contact glass fixed above the image reading unit; and
an auto document feeder openable upward and closable with respect to the contact glass, so as to convey the document to an image reading position on the contact glass, wherein
the image reading unit is capable of reading an image of the document placed on the contact glass while moving in a sub-scanning direction, and is capable of reading an image of the document conveyed to the image reading position by the auto document feeder while stopping at a position opposed to the image reading position.

7. An image forming apparatus including the image reading device according to claim 6.

* * * * *